US006034330A

United States Patent [19]

Pratt

[11] Patent Number: 6,034,330

[45] Date of Patent: Mar. 7, 2000

[54] LOAD INSULATOR

[76] Inventor: Hugh Michael Pratt, Commercial Road, Bristol BS1 6TG, United Kingdom

[21] Appl. No.: 09/037,939

[22] Filed: Mar. 10, 1998

[51] Int. Cl.[7] .......................... H02G 15/04; H02G 7/00; H02G 7/02

[52] U.S. Cl. .................... 174/178; 174/179; 174/45 TP; 174/4 TP

[58] Field of Search .................................. 174/178, 179, 174/40 TD, 45 TD, 188, 189, 140 C, 140 S, 180, 183

[56] References Cited

U.S. PATENT DOCUMENTS

| | | | |
|---|---|---|---|
| 1,502,829 | 7/1924 | Kempton | 174/178 |
| 3,260,796 | 7/1966 | Hirtzer | 174/178 |
| 3,261,910 | 7/1966 | Jacquier | 174/178 |
| 4,427,843 | 1/1984 | Ishihara et al. | 174/140 S |
| 5,568,132 | 10/1996 | Pratt | 340/657 |
| 5,745,042 | 4/1998 | Pratt | 340/657 |

*Primary Examiner*—Kristine Kincaid
*Assistant Examiner*—Mark Olds
*Attorney, Agent, or Firm*—Loeb & Loeb LLP

[57] ABSTRACT

A load insulator having an elongated, load bearing, electrically insulating body extending between and coupled to opposite metal lugs, for coupling the load insulator in a loaded line, has an electrically insulating cover formed on the outside of the body and extending over and completely covering each of the pair of metal lugs at the opposite ends of the body. The insulating cover, which is of integral, one-piece construction, and may be made of polyurethane, is formed within a mold during construction of the load insulator by leaving a void within the mold around the opposite metal lugs and the body before introducing plastic into the mold, to form the insulating cover. Covering each of the opposite metal lugs as well as the body with the insulating cover forces high voltage-produced currents through the inside of the load insulator by preventing current creep around and flashing over the outside of the insulator body. The integral, one-piece construction of the insulating cover prevents rain water and other moisture from seeping into the inside of the load insulator. The outer surface the body is provided with plural ribs or sheds, at least some of which are substantially larger than and protrude further out than intervening ribs of smaller size to prevent rain water and dirt from forming a continuous current path over the outer surface of the body.

10 Claims, 3 Drawing Sheets

LOAD INSULATOR

BACKGROUND OF THE INVENTION

1. Field of the Invention

The present invention relates to load insulators, and particularly to insulated links for interposition between a lifting device, such as an overhead crane, and a load, so as to electrically isolate the load from the lifting device.

2. History of the Prior Art

Where heavy loads are lifted by cranes or other similar mobile lifting apparatus, a particular danger exists from overhead power lines. If a part of a crane contacts a power line, a worker who is in electrical contact with the load, such as a rigger who may be controlling the lateral movement of the load, for example by means of ropes, or may himself be in physical contact with the load, may be in danger of severe electrocution as current passes to the earth. To prevent this from happening, it is known to interpose a load insulator into the loaded line. Typically, load insulators are comprised of a body and oppositely disposed fastening lugs for attachment to the lifting apparatus and to a load or loaded line. The body is load bearing in the sense that it is capable of supporting the substantial loads during the lifting operation. At the same time, and because the fastening lugs at the opposite ends of the body are typically made of steel or other conductive material, the body of the load insulator must be capable of electrically insulating the opposite lugs from each other.

Examples of load insulators are provided by U.S. Pat. No. 5,568,132 of Hugh M. Pratt, issued Oct. 22, 1996 and entitled “Load Insulator”, and by a copending application of Hugh M. Pratt, Ser. No. 08/687,156, filed Jul. 24, 1996 and entitled “Load Insulator”. The ’132 patent and the ’156 application describe load insulators in which mechanical links within a tubular body couple opposite links which form lugs at opposite ends of the body in chain-like fashion. At the same time, at least one insulative insert is interposed between an adjacent pair of the links within the body or on the outside of a load pin coupling an adjacent pair of the links within the body, to provide the necessary electrical insulation. The mechanical links of the body and the insulative insert are contained within a tubular housing member in which foam-like material has been inserted to restrict movement of the links and the insert.

As in the case of the load insulators described in the ’132 patent and the ’156 application, the body of the load insulator is either finished in or is covered by a layer of plastic or other material which electrically insulates the outside of the body and tends to prevent rain water and other moisture from entering. At the same time, the fastening lugs at the opposite ends of the body are not insulated but are exposed to the outside of the load insulator. This has been found to produce several problems. If the load line comes in contact with high voltage so that a large current must pass through the load insulator, ideally most or all of the current passes through the inside of the load insulator body where the electrical insulation is substantial. However, in cases of very high voltage, at least some of the current tends to creep around or flash over the outside of the body between the upper and lower lugs. The amount of current which flows over the outside of the load insulator has been observed to increase with the moisture level and the degree of contamination at the outer surface of the insulator body. Substantial currents bypassing the highly insulative interior of the body by flowing over the outer surface thereof increase the danger of electrocution of an operator working with the load.

A further problem with presently known insulators relates to the fact that the insulative outer surface or covering of the body terminates at the opposite end lugs. The interfaces there between tend to wick rain water or other moisture to the interior of the body, with harmful effects to the load insulator and to its insulative properties.

It would therefore be desirable to provide a load insulator which greatly minimizes or eliminates the flow of current over the outside of the insulator body between the opposite lugs. It would also be desirable to provide a load insulator having the exterior thereof sealed against rain water and other moisture so as to be less susceptible to water percolation through the insulator.

BRIEF SUMMARY OF THE INVENTION

Briefly stated, the present invention provides a load insulator which greatly minimizes or eliminates the flow of current over the outside of the load insulator, thereby forcing most or all of the current to flow through the inside thereof. In addition, the exterior of the load insulator is completely covered with a water-proof seal to prevent entry of water or moisture into the interior of the load insulator.

Load insulators in accordance with the invention include an elongated body extending between and coupled to opposite end lugs. The outside of the body has an electrically insulating and water-proof finish in the form of a cover of plastic or similar material. During formation of the load insulator, the cover is formed so as to not only cover the body but to extend over and completely cover the opposite end lugs. The result is an exterior of higher electrical resistance, which forces any current produced by exposure to high voltages to flow through the inside of the load insulator. At the same time, the cover completely seals the outside of the load insulator, including the end lugs thereof, against seepage of moisture to the interior of the load insulator.

The cover of the load insulator is of integral, one-piece construction and may comprise plastic or other appropriate material. One preferred material for the cover is polyurethane.

The body is configured so as to have a plurality of surrounding ribs or sheds to increase the creepage on the outside thereof. The ribs are covered by the cover. Selected ones of the ribs are larger and extend further out from the body than the intervening ribs, and function to shield the smaller intervening ribs from rain and prevent the formation of a water coating over the entire outer surface of the body. In addition, the larger ribs tend to prevent the formation of a coating of dirt over the entire outer surface of the body if the load insulator is placed on the ground. Reduction in water and dirt coatings on the outside of the load insulator also greatly reduces the tendency of current to flow over the outside of rather than through the inside of the load insulator.

In a preferred method of making a load insulator according to the invention, the various parts of the insulator including the top and bottom lugs are assembled and painted with an adhesive bonding agent before being placed within a mold. A void is left between an inside surface of the mold and the bonded insulator parts, including the opposite end lugs. The mold is placed in an oven for heating, following which molten plastic is pumped into the mold to fill the void and complete formation of the load insulator. The mold is then removed from the oven, and the load insulator is removed from the mold and is placed in a lower temperature oven for a select period of time. Because the void at the inner wall of the mold extends not only over the exterior of the body of the load insulator but also the end lugs as well, the resulting cover formed by the plastic extends from the outside of the body and completely covers the lugs at the opposite ends of the load insulator. The result is an integral, one-piece cover of plastic which completely surrounds the exterior of the load insulator including the opposite end lugs.

BRIEF DESCRIPTION OF THE DRAWINGS

Embodiments of the invention are described, by way of example only, with reference to the following drawings, in which.

DETAILED DESCRIPTION

Figure 1:
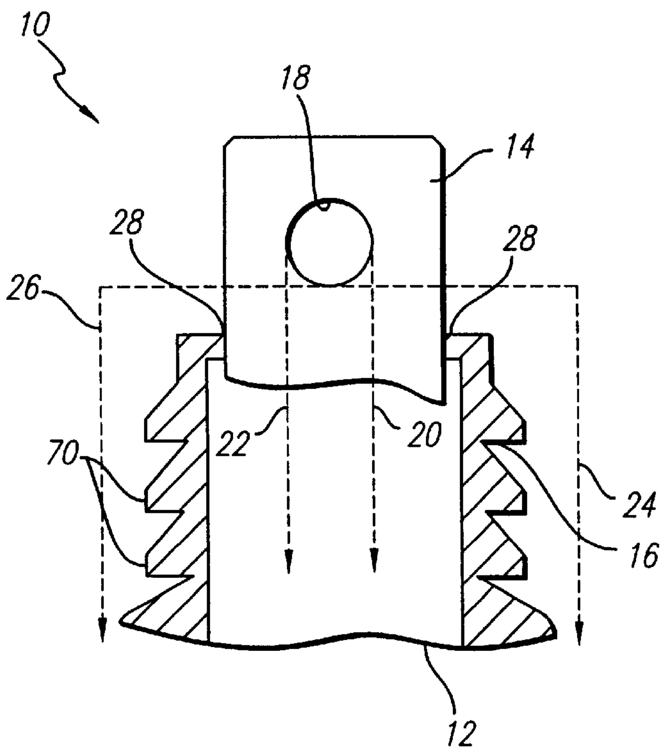
FIG. 1 PRIOR ART
FIG. 1 is a sectional view of a portion of a prior art load insulator.

FIG. 1 is a cross-sectional view of a portion of a prior art load insulator 10. The portion of the load insulator 10 shown in FIG. 1 includes an upper portion of a body portion 12 of the load insulator 10 together with an upper lug 14 extending from the body portion 12. As shown in the cross-sectional view of FIG. 1, the outside of the body portion 12 is covered by a cover 16, which may be of plastic or other appropriate construction so as to be electrically insulating and so as to form a water-proof seal. The cover 16 terminates at the base of the lug 14. Consequently, the upper lug 14 extends through and outside of the cover 16 at the upper end of the body portion 12. Although not illustrated in FIG. 1, an opposite lower lug extends through and outside of the cover 16 at the lower end of the body portion 12 of the load insulator 10. The lug 14 is provided with a central aperture 18 to assist in coupling the load insulator 10 within a load line.

If the load insulator 10 of FIG. 1 is accidentally exposed to high voltage, such as would occur if a cable coupled to the lug 14 should accidentally touch a power line, then current flows through the load insulator 10 to the opposite lower end thereof. Ideally, such current should flow through the body portion 12 which presents a high resistance to the current. However, the outer surface of the cover 16 also presents a path to the current, particularly if the outer surface of the load insulator 10 is contaminated or if a substantial amount of moisture is present. In such instances, the outer surface of load insulator 10 presents an alternative path for current at the lug 14, causing at least some of the current to flow over the outside of the load insulator 10. Ideally, most or all of the current at the lug 14 flows through the body portion 12 of the load insulator 10, as illustrated by dotted lines 20 and 22 in FIG. 1. In reality, however, at least some of the current flows over the outer surface of the load insulator 10, as illustrated by dotted lines 24 and 26.

A further problem of the prior art load insulator 10 relates to the fact that the cover 16 terminates at and forms an interface 28 with the lug 14. As the load insulator 10 is exposed to rain and other moisture, the moisture eventually wicks through the interface 28 and into the interior of the load insulator 10. This is undesirable in as much as it causes deterioration of the load insulator. Moreover, the presence of moisture within the load insulator 10 adversely effects the electrically insulative properties thereof.

Figure 2:
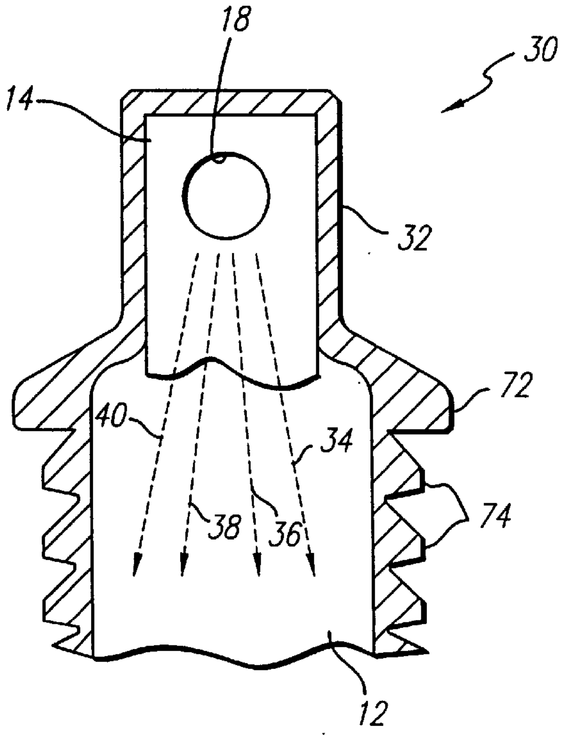
FIG. 2 is a sectional view of a portion of a load insulator according to the invention.

To force most if not all of the current at the upper lug 14 through the body portion 12 of the load insulator, and to seal the load insulator 10 against entry of moisture therein from the outside, load insulators in accordance with the invention extend the cover 16 so as to surround and completely cover the opposite lugs. FIG. 2 shows a load insulator 30 in accordance with the invention which has a body portion 12 and an upper lug 14 like those of the load insulator 10 of FIG. 1. However, instead of terminating the cover 16 at the base of the lug 14, as in the case of FIG. 1, the load insulator 30 of FIG. 2 is provided with a cover 32 which extends from the outer surface of the body portion 12 over and around the lug 14 so as to completely cover the lug 14. Although not shown in FIG. 2, the cover 32 also extends over and surrounds the opposite lug at the bottom end of the body portion 12. This is shown and described hereafter in connection with FIGS. 3 and 4. The provision of the load insulator 30 with a cover 32 that extends from the body portion 12 over and surrounds the opposite lugs, presents a current path of very high resistance at the outer surface of the load insulator 30. Consequently, most if not all of the current at the lug 14 is forced to flow through the body portion 12, as illustrated by dotted lines 34, 36, 38 and 40 in FIG. 2.

Figure 3:
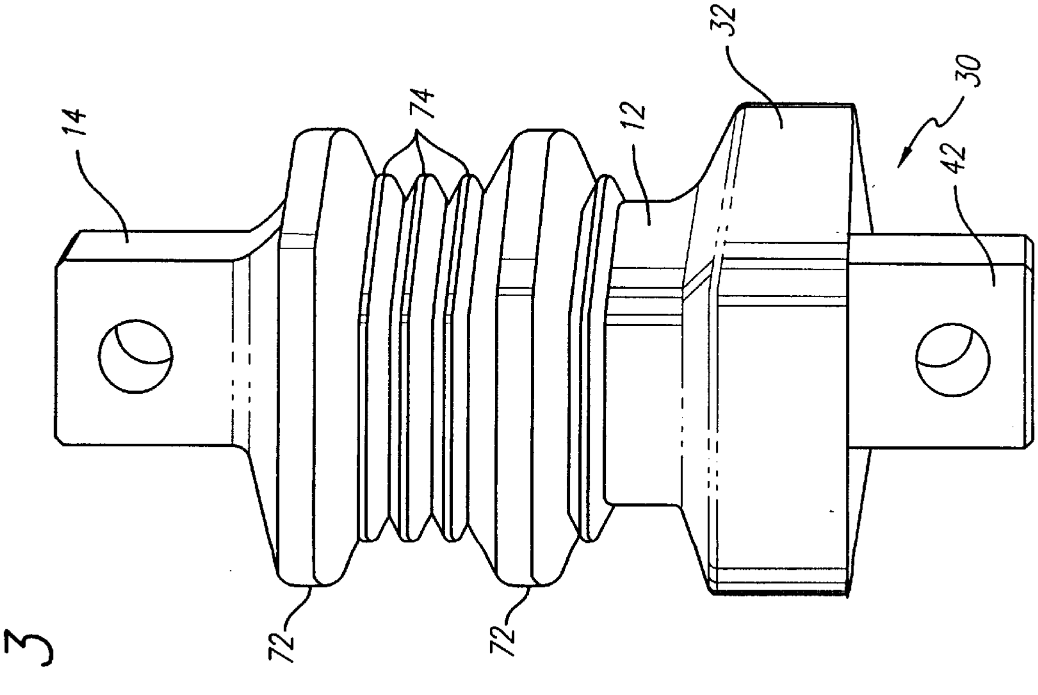
FIG. 3 is a full perspective view of the load insulator of FIG. 2.

FIG. 3 is a perspective view of the entire load insulator 30 of FIG. 2. As shown in FIG. 3, the load insulator 30 has a lower lug 42 opposite the upper lug 14 which extends from the lower end of the body portion 12. As in the case of the upper lug 14, the lower lug 42 is completely surrounded and encapsulated by the cover 32 on the outer surfaces of the body portion 12, the upper lug 14 and the lower lug 42. The cover 32 is of integral, one-piece, molded construction so as to form a complete moisture barrier or water-proof seal at the outside of the load insulator 30. In addition, the portions of the cover 32 which cover the lugs 14 and 42 combine with the portions of the cover 32 covering the body portion 12 to define a current path of very high resistance at the outside of the load insulator 30.

Figure 4:
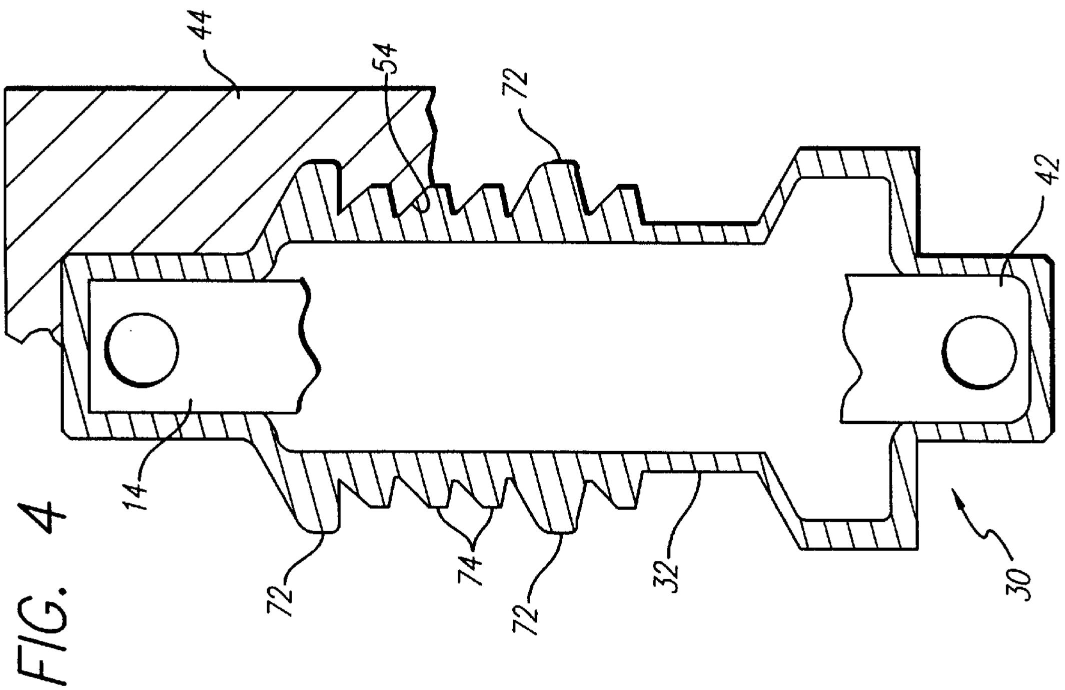
FIG. 4 is a sectional view of the load insulator of FIG. 3, together with a portion of a mold, illustrating the manner in which the cover of the load insulator is formed during manufacture of the load insulator.

FIG. 4 is a cross-sectional view of the load insulator 30 of FIG. 3, together with a portion of a mold 44 used to make the load insulator 30. As shown in FIG. 4, the cover 32 is one continuous, integral piece of plastic or other insulating material surrounding the entire outer surface of the load insulator 30. Consequently, a path of very high resistance is formed at the outside of the load insulator 30. At the same time, the continuous nature of the cover 32, and the fact that it is water-proof, prevents moisture from entering the inside of the load insulator 30.

For the sake of simplicity, the details of the body portion 12 which extend between and couple the opposite lugs 14 and 42 are not shown in FIGS. 2 or 4. Only the general outline of the body portion 12 is shown, in as much as it is this outer surface which is covered by the cover 32 in accordance with the invention. In actuality, the body portion 12 can comprise any appropriate configuration having the necessary load bearing and insulating properties. One example is the arrangement shown in FIGS. 6 and 7 of the previously referred to '132 patent in which opposite links are coupled together by a load pin having an insulative insert thereon. Regardless of the internal configuration, the addition of a bonding agent adhesive thereto as described hereafter in connection with the method of FIG. 5 typically provides the body portion 12 with a generally cylindrical shape and thus the outline shown in FIGS. 2 and 4.

Figure 5:
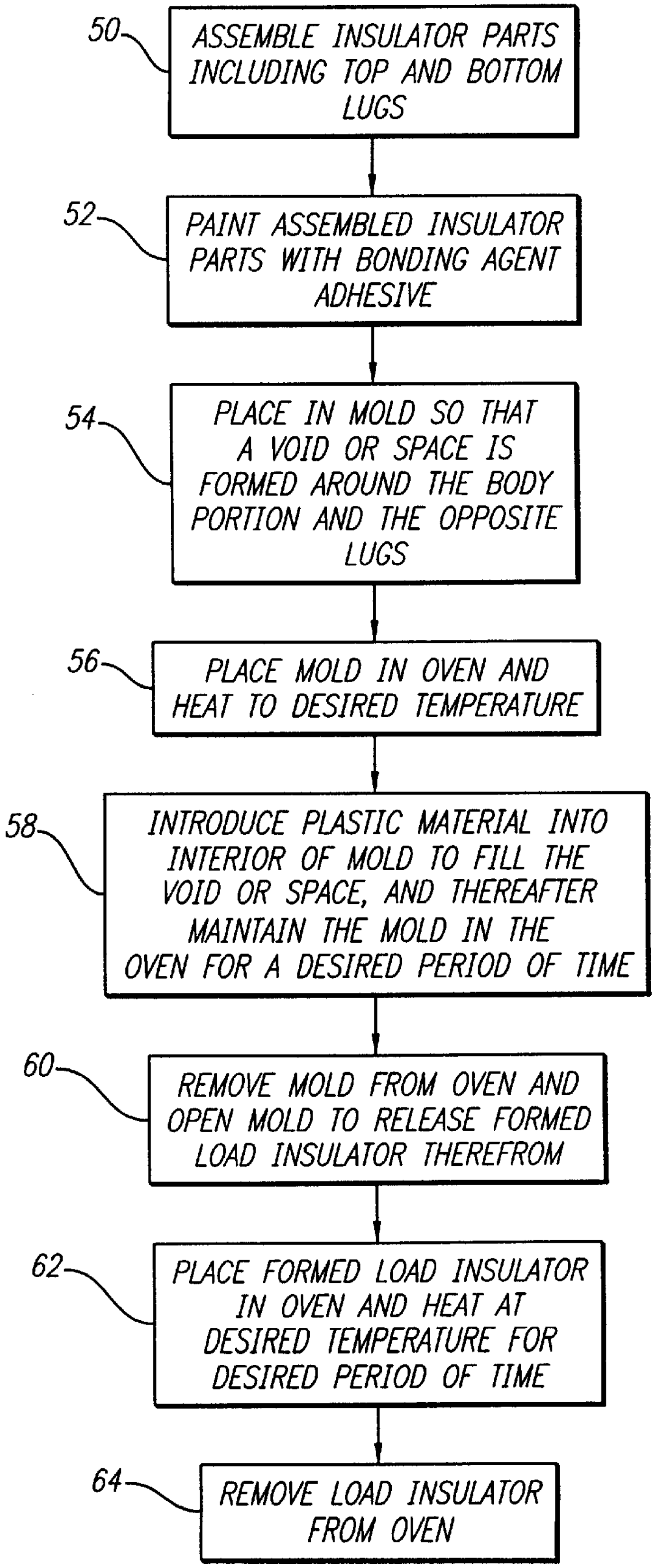
FIG. 5 is a block diagram of the successive steps in a preferred method of making a load insulator according to the invention.

FIG. 5 shows the successive steps of a method of making the load insulator 30 in accordance with the invention, using a mold such as the mold 44 shown in FIG. 4. In a first step 50, insulator parts are assembled. The assembled parts include the upper lug 14 and the lower lug 42 and the interconnecting load bearing and insulating structure which forms the major portion of the body portion 12.

In a following step 52, the assembled parts are painted with an adhesive in the form of a bonding agent. This primes the assembled parts. An example of a suitable bonding agent is Thixon 405.

In a next step 54, the assembled and bonded insulator parts are placed in a mold, such as the mold 44 partially shown in FIG. 4, so that a void or space is formed around the body portion 12 and the opposite lugs 14 and 42. The void or space defines the shape and thickness of the cover 32 to be formed thereover.

In a following step 56, the mold is placed in an oven and is heated, such as to a temperature of 100° C.

In a next step 58, and while heated in the oven, the plastic material used to form the cover 32 is introduced into the mold. Where polyurethane in the form of a thermosetting resin is used, the polyurethane is pumped into the interior of the mold 44 through a first aperture in the mold. A second aperture in the mold lets air out of the mold, as the polyurethane fills the void or space in the mold. The polyurethane gels in about 20 minutes, and begins to form the cover 32 on the load insulator. The mold is allowed to remain in the oven for about 1 hour.

In a following step 60, the mold is removed from the oven and is opened to release the formed load insulator therefrom.

In a next step 62, the formed load insulator is placed in an oven and is heated at a desired temperature for a desired period of time. In the present example, the load insulator is heated at 80° C. for approximately 24 hours.

In a final step 64, the load insulator is removed from the oven.

As shown in FIGS. 2–4, the body portion 12 of the load insulator 30 is provided with a plurality of ribs or sheds 72 and 74 which extend around the circumference thereof and increase the creepage. The smaller ribs 74 are of like size and tend to prevent formation of a continuous layer of water, such as from rain, or a continuous layer of dirt or other contamination, either of which forms a conductive path which encourages current flow over the outside of rather than through the inside of the load insulator. Nevertheless, if sufficient water forms, or if the load insulator is exposed to a substantial amount of dirt or contamination, such as by being laid on the ground, then there may still be a tendency for current to flow over the outside of the load insulator.

In accordance with the invention, the load insulator 30 is provided with one or more of the ribs 72 which are substantially larger in size so as to extend outwardly from the plurality of smaller ribs 74. The larger ribs 72 serve two functions. First, because they protrude further than the smaller ribs 74, they tend to prevent rain water from accumulating along the entire length or even substantial portions of the length of the body portion 12. This greatly reduces the tendency for current to flow over the outside of the body portion 12. Second, the larger ribs 72 tend to prevent substantial layers of contaminants such as dirt from forming on the outer surface of the body portion 12, such as when the load insulator is laid on the ground. If the load insulator 30 of FIGS. 2–4 is laid in dirt, the larger ribs 72 rest on the dirt in such a way as to hold the smaller ribs 74 away from the dirt and thereby tend to prevent the formation of substantial areas of dirt or other contaminants on the outer surface of the body portion 12. This also greatly reduces the tendency for current to flow over the outside of the body portion 12 rather than through the body portion 12.

While various forms and modifications have been suggested, it will be appreciated that the invention is not limited thereto but encompasses all expedients and variations falling within the scope of the appended claims.

What is claimed is:

1. A load insulator comprising the combination of a load bearing body having a pair of lugs of conductive material extending from opposite ends of the body for coupling the load insulator in a loaded line, and an electrically insulating cover formed on the outside of the body, the insulating cover extending over and completely covering the pair of lugs.

2. The invention set forth in claim 1, wherein the pair of lugs comprise steel lugs, each having a hole therein to facilitate coupling of the load insulator in a loaded line, and the body comprises a load bearing electrically insulating assembly extending between and coupled to the pair of lugs.

3. The invention set forth in claim 1, wherein the body has a plurality of ribs formed on the outside thereof and at least one of the plurality of ribs is substantially larger than and protrudes further to the outside of the body than other ones of the plurality of ribs.

4. The invention set forth in claim 1, wherein the insulating cover completely covers the body as well as each of the pair of lugs.

5. The invention set forth in claim 4, wherein the insulating cover is of integral, one-piece construction.

6. The invention set forth in claim 5, wherein the insulating cover is made of polyurethane.

7. A load insulator comprising the combination of an opposite pair of metal lugs, each having an aperture therein, a load bearing, electrically insulating body of generally cylindrical shape extending between and coupled to the opposite pair of metal lugs, and an electrically insulating plastic cover formed on the outside of the load insulator, the plastic cover completely covering the insulating body and each of the opposite pair of metal lugs.

8. The invention set forth in claim 7, wherein the plastic cover is of integral, one-piece, molded construction.

9. The invention set forth in claim 8, wherein the plastic cover is made of polyurethane.

10. A method of making a load insulator comprising the steps of:

providing a mold;

assembling insulator parts including top and bottom lugs;

painting the assembled insulator parts with an adhesive;

placing the assembled insulator parts in the mold so as to form a void between an inside of the mold and the assembled insulator parts including the top and bottom lugs;

filling the void with plastic to form an integral, one-piece plastic covering over the outside of the assembled insulator parts including the top and bottom lugs; and removing the load insulator from the mold.

* * * * *